United States Patent [19]

Gottlieb et al.

[11] 4,440,540
[45] Apr. 3, 1984

[54] APPARATUS FOR LIFTING A WHEELCHAIR ONTO THE ROOF OF AN AUTOMOBILE

[76] Inventors: David Gottlieb, 15 Devorah Hanevia St.; Eliezer Zer, 6 Amos St., both of Bnei Brak, Israel

[21] Appl. No.: 211,913

[22] Filed: Dec. 1, 1980

Related U.S. Application Data

[63] Continuation-in-part of Ser. No. 880,572, Feb. 23, 1978, Pat. No. 4,236,860.

[51] Int. Cl.³ .............................................. B60R 9/00
[52] U.S. Cl. ................................... 414/462; 414/541; 414/546; 414/555; 414/921
[58] Field of Search ............... 414/250, 462, 546, 917, 414/920, 549, 742, 541, 555, 921, 618, 619, 620; 224/310; 296/65 R, 65 A; 410/2, 3, 4, 21, 51

[56] References Cited

U.S. PATENT DOCUMENTS

| 2,668,630 | 1/1951 | Ertl | 414/742 X |
| 3,823,839 | 7/1974 | Petzing et al. | 414/462 |
| 3,878,955 | 4/1975 | Udden | 414/462 |
| 4,039,096 | 8/1977 | McAllister | 414/462 |
| 4,093,303 | 6/1978 | Nelson | 410/51 X |
| 4,134,509 | 1/1979 | Clement | 414/462 |
| 4,242,030 | 12/1980 | Clement | 414/542 X |

Primary Examiner—Robert J. Spar
Assistant Examiner—Ken Muncy

[57] ABSTRACT

A device for selectably positioning onto an automobile an invalid's wheelchair comprising a fixed support apparatus mountable onto the roof of an automobile and defining a fixed track, an axle arranged for rotational rolling engagement with the track and movement therealong, and wheelchair support shaft apparatus defining first and second ends, the first end being rotatably mounted onto the axle and the second end being associated with a wheelchair for support thereof.

2 Claims, 19 Drawing Figures

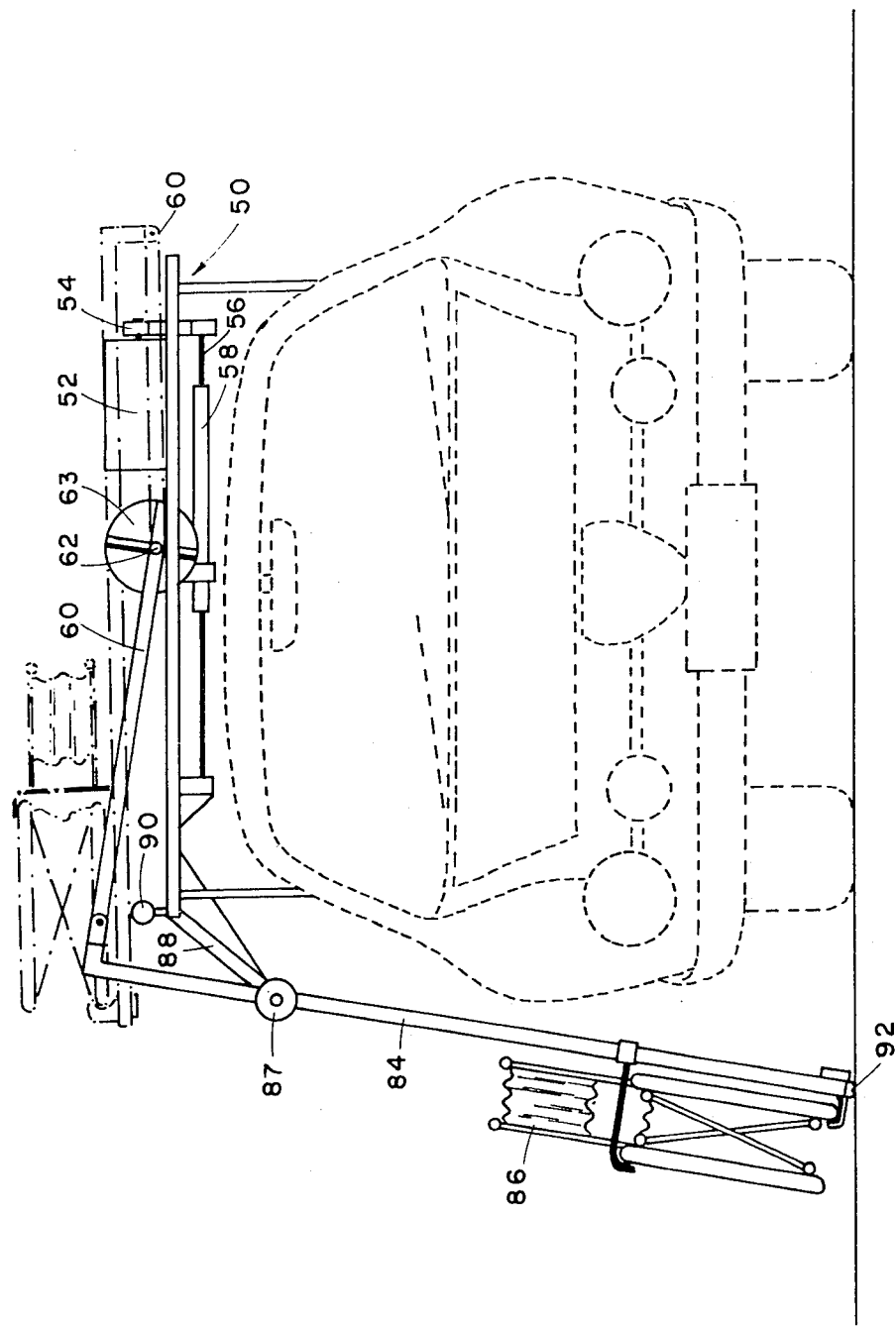

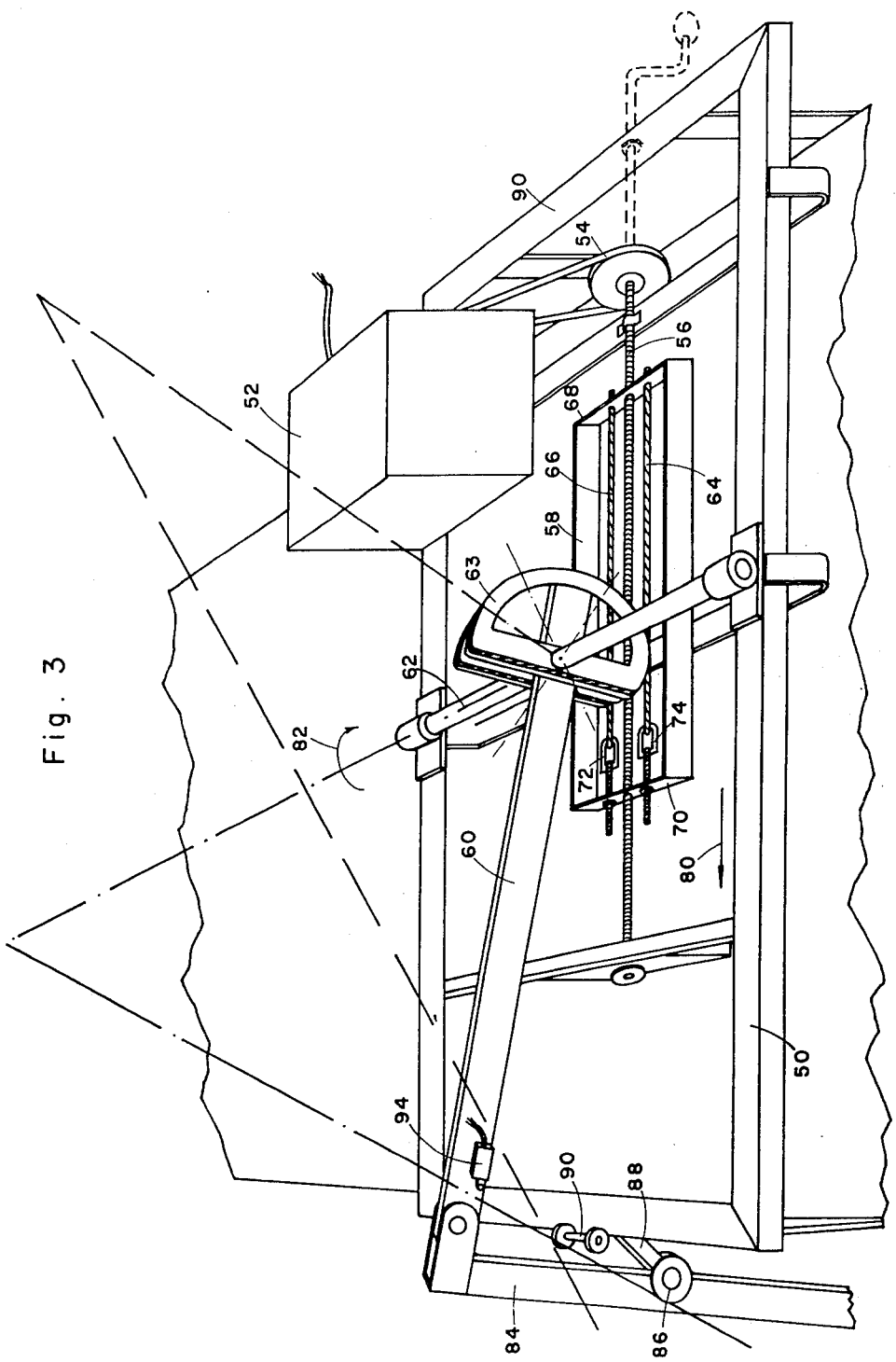

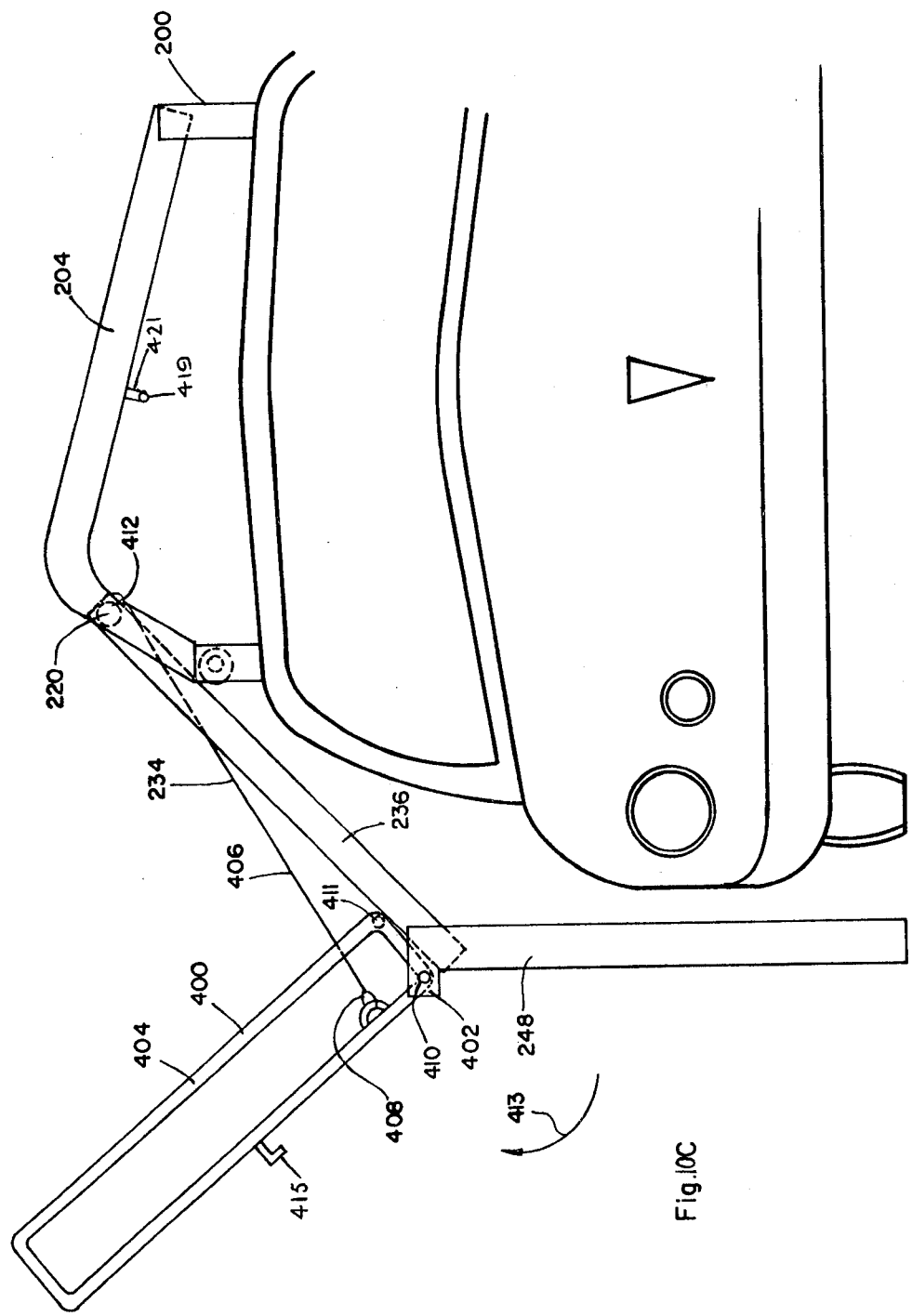

APPARATUS FOR LIFTING A WHEELCHAIR ONTO THE ROOF OF AN AUTOMOBILE

This is a continuation-in-part of application Ser. No. 880,572, filed Feb. 23, 1978, now U.S. Pat. No. 4,236,860.

FIELD OF THE INVENTION

The present invention relates to apparatus for assisting the mobility of invalids generally, and more particularly to a device for automatically raising, storing and lowering an invalid mobility aid, such as a wheelchair, onto and from a motor vehicle such as an automobile.

BACKGROUND OF THE INVENTION

It has become quite common for invalids, who are unable to walk and thus must be confined to a wheelchair, to be provided with specially equipped automobiles which the invalids can drive by themselves. The provision of such automobiles would enable many crippled persons to be able to travel by themselves in their own automobiles were it not for the fact that in many cases an invalid is unable to store the wheelchair in his car after removing himself therefrom, without the assistance of another person. A further difficulty is that normally the wheelchair is stored in the rear seat area of a car and thus cars of a certain minimum size must be provided.

A number of wheelchair lifting mechanisms are known in the patent literature. U.S. Pat. No. 4,039,096 shows wheelchair storage apparatus which employs a motor fixed within a casing. The motor operates a winch which causes a wheelchair mounting frame to move from a loading position vertically and then horizontally into a storage position within the casing. While passing from the storage position to the loading position and vice versa, the wheelchair extends outwardly in a horizontal direction. This involves possible danger and damage to nearby persons and property.

U.S. Pat. No. 3,878,955 shows a wheel chair transport device for a passenger car. This device involves the use of permanently fixed track elements on the side of the car, rendering it incompatible with the use of a four-door car.

U.S. Pat. No. 3,823,839 shows a cartop carrier elevator comprising a movable cam path along which a cradle moves when supported on the car roof. The cradle is lowered alongside the automobile by means of a flexible chain. Due to the flexible nature of this chain, sufficient clearance between the chain and the side of the automobile must be assured in order to prevent possible damage to the automobile due to impact with the chain and the cradle.

SUMMARY OF THE INVENTION

The present invention seeks to provide greater mobility to crippled persons by enabling them to effect the transition from wheelchair to car or from car to wheelchair without outside assistance by providing means for automatically storing a wheelchair or similar appliance on the roof of an automobile. Storage on the roof of an automobile also eliminates the former requirement that a relatively large car be provided.

The present invention distinguishes from the prior art patents described hereinabove in that it employs a smoothly curved movement path. Furthermore the former requirement for a relatively large side clearance is also eliminated.

There is thus provided in accordance with an embodiment of the invention a device for selectably positioning an invalid's mobility aid appliance onto an automobile comprising; support apparatus mountable onto the roof of the vehicle, transfer apparatus mounted on the support apparatus for selectably transporting a mobility aid appliance between a storage position and a utilization position adjacent to the automobile, and a cover member hingedly mounted onto the support apparatus so as to assume a raised orientation during the transport of the mobility aid appliance between storage and utilization positions and a lowered orientation when the mobility aid appliance is stored therebelow.

In accordance with an embodiment of the invention the transfer apparatus comprises an extensible shaft supporting the mobility aid appliance, a moving frame member supporting the extensible shaft and an electric motor mounted on the moving frame member. The support apparatus defines a fixed cam path which is engaged by a drive member coupled to the output shaft of the electric motor.

Further in accordance with a preferred embodiment of the invention, the cover member is spring mounted onto the support apparatus and is urged into a raised position by the spring. The motion of the moving frame member moves the cover member against the urging of the spring into a lowered orientation.

Furthermore in accordance with an embodiment of the invention wherein the mobility aid appliance is a wheelchair or the like, means may also be provided for positioning the mobility aid appliance in the utilization position in an upright unfolded position and in a desired orientation.

Additionally in accordance with an alternative embodiment of the invention the transfer means comprise a screw-drive associated with a lever whose fulcrum varies along the axis of the drive-screw so as to provide generally uniform and smooth travel of said wheelchair between said storage position and said utilization position.

BRIEF DESCRIPTION OF THE DRAWINGS

The invention will be more fully understood and appreciated from the following detailed description taken in conjunction with the drawings in which:

FIG. 2 is a pictorial view of positioning apparatus constructed and operative in accordance with an alternative embodiment of the invention;

FIG. 3 is a pictorial illustration showing the apparatus of the embodiment of FIG. 2 in greater detail.

FIGS. 10A, 10B and 10C show a selectable positioning device according to an alternative embodiment of the invention in respective stored, intermediate and lowered orientations;

DETAILED DESCRIPTION OF THE INVENTION

Figure 1:
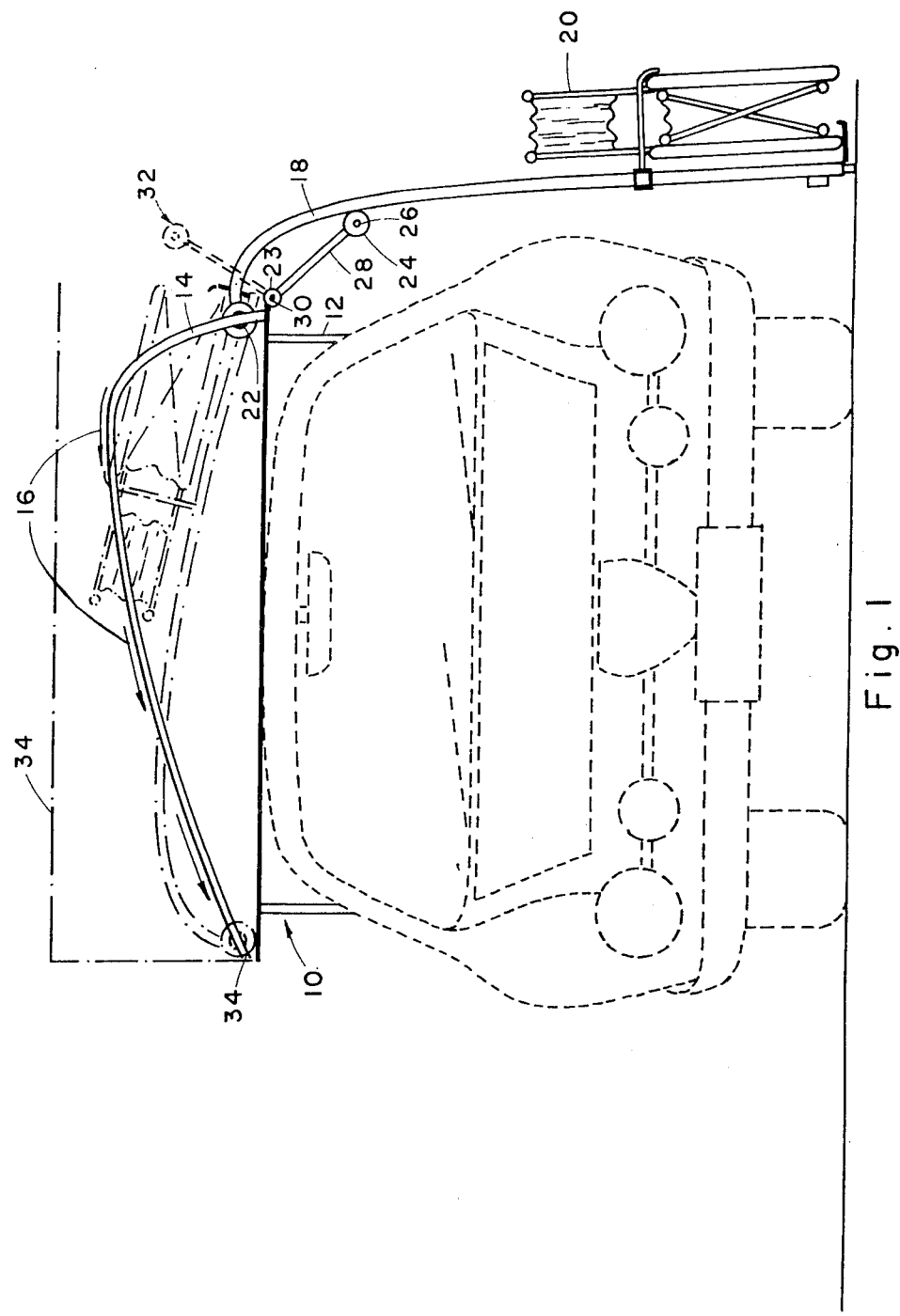
FIG. 1 is a pictorial illustration of positioning constructed and operative in accordance with an embodiment of the invention.

Referring now to FIG. 1, there is shown apparatus in association with an automobile for selectably positioning an invalid's mobility aid appliance comprising a support structure 10 which may be akin to a conventional flat roof rack and may be attached onto the roof or sides of an automobile by any conventional means such as, for example, clamping the support legs 12 thereof onto the peripheral structures of the automobile roof.

Fixedly mounted onto the support structure 10 is a cam path member 14 which defines a curved travel path as illustrated by arrows 16. A movable arm 18 is provided for removable engagement with a wheelchair 20 or any other invalid aid apparatus. One extreme end of arm 18 is associated with a drive mechanism, preferably an electrical motor having a rotating driving member 22 which by virtue of its rotation travels along cam path 16. According to one embodiment of the invention a chain path may be associated with cam path 14 and driving member 22 may be a toothed member which engages the chain links as it travels along the cam path. The motor may be mounted on arm 18 and move therewith or, alternatively, may be mounted on support structure 10. Alternatively, driving axle or member 22 may be a frictional member which frictionally engages the surface of cam path 14 preventing slippage. A roller 23 is mounted for rotation about an axis 30 to support arm 18 during movement and storage thereof.

To prevent inadvertent engagement of arm 18 with the side of the automobile a movable support roller 24 may be provided in association with support structure 10. Preferably support roller 24 is freely rotatable about an axis 26 which is in turn mounted on a shaft 28. Shaft 28 is desirably spring mounted onto support structure 10 for rotation about axis 30. This spring mounting or an analogous movable mounting is provided to prevent, insofar as possible, interference with the opening of side doors of the automobile and ingress thereto and egress therefrom. Thus the support roller 24 and its mounting structure, when not engaging arm 18, are urged into a raised position as indicated in phantom and designated by reference numeral 32.

A movable or fixed cover member 34 may conveniently be associated with the apparatus described hereinabove and may be configured to minimize insofar as possible wind resistance to forward movement of the automobile.

Operation of the apparatus described hereinabove will now be summarised. The movable arm 18 together with the wheelchair 20 supported thereon in the exemplary illustration of FIG. 1 are maintained in a storage position above the automobile wherein driving member 22 lies at the extreme inner end 34 of the cam path 14, as indicated in phantom lines and arm 18 is supported on roller 23. Upon application of a suitable electrical signal, which may be provided from a control panel inside the automobile, driving member 22 moves with respect to cam path 14 in a direction opposite to that of arrows 16 until arm 18 reaches a substantially vertical position and the wheelchair 20 is located alongside the automobile as illustrated. Raising of the wheelchair is accomplished by an analogous operation with movement in the opposite direction.

According to an alternative embodiment of the invention a movable driving element such as a chain may be associated with cam path 14 for driving of a passive member associated with arm 18.

Reference is now made to FIGS. 2 and 3 which show alternative embodiments of the invention. A support structure 50, substantially similar in all relevant respects to support structure 10 (FIG. 1) is associated with an automobile. An electric motor 52 is mounted on support structure 50 and provides a rotary output via a belt drive arrangement 54 to a threaded rotatable shaft 56 which is in turn rotatably supported at support structure 50. A movable carriage 58 threadably engages rotatable shaft 56 and moves either back or forth along the longitudinal axis of shaft 56 depending on the direction of rotation of the shaft. A raising arm 60 is mounted at a first end thereof onto a shaft 62 which is in turn rotatably mounted onto support structure 50 for rotation about the axis of the shaft. Also fixedly associated with shaft 62 is a half-moon fulcrum member 63 about whose peripheral surface are looped a pair of generally parallel disposed cables 64 and 66 which are secured at their respective extreme ends to the first and second ends 68 and 70 of movable carriage 58 and are maintained in a taut condition by adjustment of tighteners 72 and 74.

As can be appreciated from the detailed illustration in FIG. 3 the movement of carriage 58 relative to shaft 62 in a forward direction indicated by an arrow 80 draws the ends of cables 62 and 64 attached to end 70 of carriage 58 to cause half-moon fulcrum member 63 to rotate in a clockwise direction indicated by arrow 82 causing raising of arm 60. Similarly motion of carriage 58 in a direction opposite to that of arrow 80 draws the ends of cables 64 and 66 attached to end 68 of carriage 58 to cause member 63 to rotate in a counter-clockwise direction opposite to arrow 82, causing lowering of arm 60.

The outer extreme end of arm 60 is rotatably coupled to a support arm 84 which in turn supports a wheelchair 86 or any other invalid mobility aid appliance. A support roller 87 mounted on a shaft 88, which may in turn be spring mounted onto support structure 50, may be provided to prevent arm 84 from engaging the side surface of the automobile. A roller 90 is provided for supporting arm 84 as it is being raised to a storage position.

The apparatus illustrated hereinabove in FIGS. 1-3 is designed for automated operation in response to control signals provided by an operator sitting inside the vehicle.

Upon application of a start signal to motor 52 movable carriage 58 is caused to move in a direction opposite to that of arrow 80 thereby rotating arm 60 about the axis of shaft 62 and lowering it until it engages roller 90. At such point a microswitch 92 senses contact between arm 84 and the ground surface and provides a signal which terminates operation of the electric motor. Similarly, when it is desired to raise the wheelchair from the utilization position alongside the automobile to a storage position, a suitable signal is provided by the operator from within the vehicle causing electric motor 52 to rotate in a direction which causes carriage 58 to move in a direction indicated by arrow 80. When arm 60 reaches its extreme retracted position, which is typically in engagement with a roller 90 of support structure 50, a microswitch 94 mounted on arm 60 or on any other suitable member provides a signal causing termination of the motor operation.

The provision of a movable carriage 58, half-moon fulcrum member 63 and associated apparatus is designed to provide relatively smooth and uniform travel of the wheelchair even as arm 60 passes its apex. Thus the apparatus illustrated in FIGS. 2 and 3 is an alternative to that illustrated in FIG. 1.

It is appreciated that in FIG. 1 microswitches may be suitably positioned in association with support structure 10, arm 18 or any other suitable member to enable automatic termination of motor functioning once the apparatus reaches the utilization or storage positions.

Figure 4B:
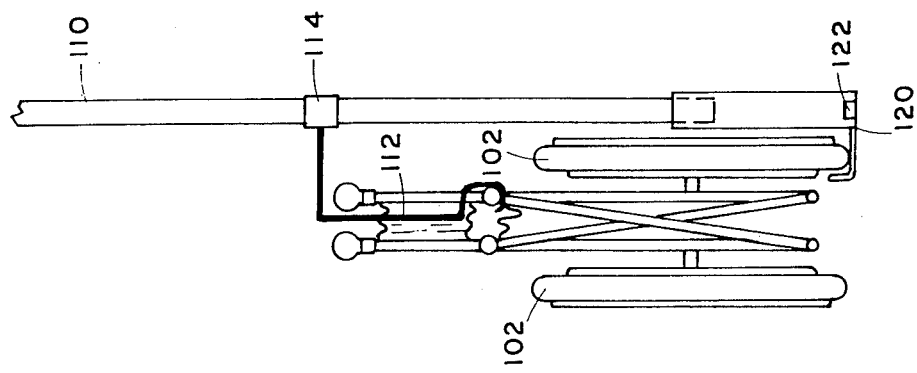
FIGS. 4a and 4b are side view illustrations of apparatus for automatically positioning a wheelchair in respective open and closed configurations when in a utilization position.
Figure 4A:
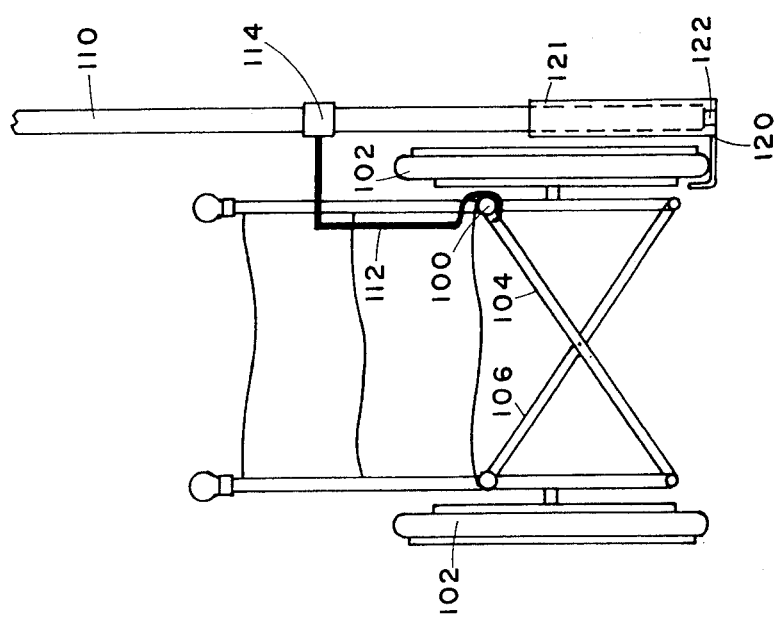

Reference is now made to FIGS. 4a and 4b which show apparatus for automatically opening and closing a wheelchair which may advantageously be incorporated in the apparatus of the present invention.

It is to be appreciated from the outset that opening and closing of a wheelchair is effected by changing the vertical position of seat support members 100 with respect to the vertical position of wheels 102 thus causing the folding or unfolding of cross-members 104 and 106.

A support shaft 110 which may be completely analogous to arm 18 (FIG. 1) or support member 84 (FIGS. 2 and 3) is attached to lifting and lowering apparatus (not shown) which has been described hereinabove. An engaging member 112 movably engages the seat support member 100 on one side of the wheelchair and is fixedly attached to shaft 110 by means of a mounting sleeve 114.

A wheel support element 120 which engages one wheel 102 of the wheelchair is slidably mounted on shaft 110 permitting relative generally vertical movement between shaft 110 and element 120. A microswitch 122 is preferably associated with shaft 110 and element 120 to indicate that shaft 110 is fully seated in element 120.

As illustrated in FIG. 4a the wheelchair is fully opened when shaft 110 is fully seated in element 120 and member 100 is located at its lowest vertical position relative to wheels 102. As shaft 110 is raised, element 112 engaging element 110 is raised therewith while the chair wheels are not raised. Support shaft 110 slides with respect to element 120 along a predetermined distance and until stopped by a stopper associated with shaft 110. Thus members 100 are raised with respect to the wheelchair body causing the wheelchair to assume a closed orientation as illustrated in FIG. 4b.

It is appreciated that both opening and closing of the wheelchair can only be effected if the wheel 102 opposite to that engaging element 120 is free to move in a transverse direction. It is noted from FIGS. 1 and 2 that the apparatus is arranged such that the wheelchair is located in its utilization position adjacent the automobile at a slight angle whereby wheel 102 which is not engaged by element 120 is clear of the ground surface.

Upon lowering of the wheelchair initially disposed in an orientation illustrated in FIG. 4b the element 120 is initially extended with respect to shaft 110. When element 120 contacts the ground surface, shaft 110 continues to be lowered thus forcing member 100 downwardly with respect to the chair frame until the extreme lower end of shaft 110 reaches a position with respect to element 120 at which microswitch 122 provides a signal to the motive mechanism to terminate operation. Thus from the time of initial contact with element 120 with the ground surface the termination of operation element 112 forces member 100 vertically downwardly thus opening the wheelchair to an orientation illustrated in FIG. 4a.

Reference is now made to FIGS. 5, 6, 7, 8A, 8B and 8C wich illustrate a preferred embodiment of the invention operative in a manner generally similar to the operation of the embodiment illustrated in FIG. 1.

In accordance with this embodiment of the invention, a fixed support frame 200 is supported onto the roof of an automobile. Support frame 200 comprises a pair of elongate members 202 wich are arranged to lie along the length of the roof and are secured thereto by conventional means, similar to those used for securing a conventional roof rack onto the roof of a vehicle. Elongate members 202 are joined by transversely disposed, generally L-shaped curved cam members 204, which are mounted on upstanding posts 206, fixedly attached, as by welding, to members 202.

Cam members 204 are configured to define in cross-section a C-shape, including a central generally vertically disposed portion 208 and upper and lower flanges, 210 and 212 respectively. Disposed along the interior surface of lower flange 212 is a chain-like surface 214, suitable for permitting a toothed member to be driven in a non-slipping fashion therealong. A similar type of surface, which may be constructed by fixing a chain alongside the flange, may be incorporated in association with the upper flange alternatively or additionally.

Elongate members 202 are also joined by selectably extendable transverse braces 216, so as to adjustably fit variously sized vehicles.

A drive axle 220 formed with sprockets 222 at the extreme ends thereof is disposed transversely between cam members and such that sprockets 222 engage the chain-like surfaces 214 of the respective cam members. This engagement permits rotational motion imparted to axle 220 to cause motion of axle 220 along the path defined by cam members 204.

Rotational motion is imparted to drive axle 220 by means of a motor 224, typically electrically driven, whose output shaft is coupled by a gear assembly 226 comprising belts and pulleys or gears and chains, for example, to drive axle 220. Motor 224 is mounted, via a mounting support 228, onto a moving frame 230.

Moving frame 230 is mounted onto drive axle 220 as by slip rings 232 or any other suitable mounting apparatus which permits frame 230 to move along the cam path together with axle 220 and be driven thereby but without causing frame 230 to rotate along with the rotation of axle 220.

Rotatably mounted onto axle 220 is an extendible shaft assembly 234. As seen with particularity in FIGS. 5 and 6 the extendible shaft assembly comprises an upper shaft 236 of generally U-shaped cross-section. Shaft 236 is apertured at its upper end to permit passage therethrough of axle 220. Located intermediate the uptanding portions of the U-shaped shaft is a sprocket 238 which is fixed to axle 220 for rotation together therewith. An endless chain 240 engages sprocket 238 and similarly engages a second sprocket 242 which rotates about an axle 244 fixed with respect to shaft 236 and is located at an end thereof opposite from sprocket 238.

Chain 240 lies exposed from above. Fixedly attached to a link of chain 240 is an upstanding threaded pin 246. Pin 246 engages the upper end of a lower shaft 248, and is attached thereto as by a nut 247. Lower shaft 248 is an elongate member of generally U-shaped cross-section and is oriented oppositely to upper shaft 236. Wheelchair support means similar to those illustrated in FIGS. 1, 4a and 4b are mounted onto lower shaft 248. According to an alternative embodiment of the invention a static wheelchair support which does not effect automatic opening or closing of the wheelchair may be employed.

Figure 5:
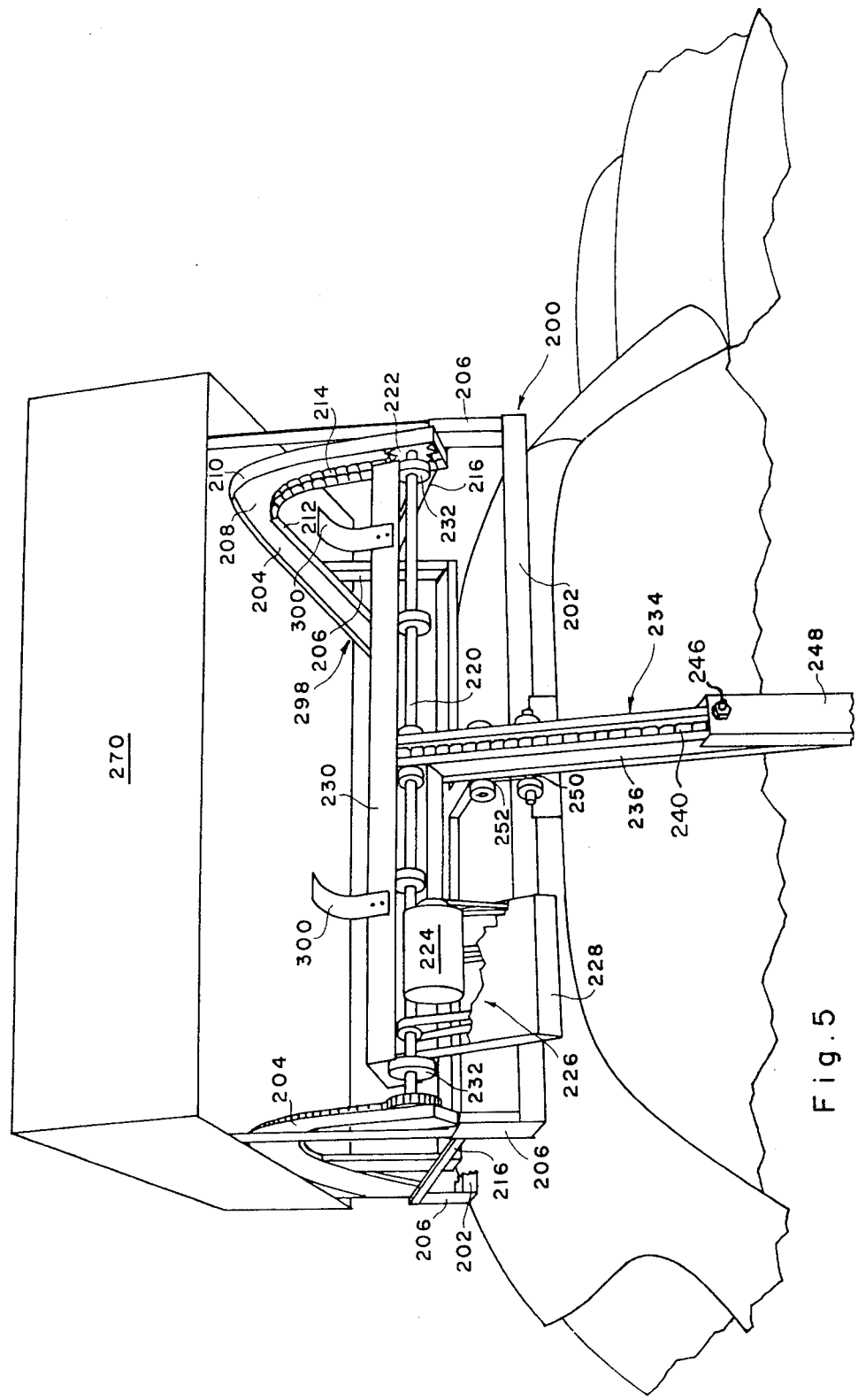
FIG. 5 is a pictorial illustration of a preferred embodiment of the invention of the general type illustrated in FIG. 1.
Figure 6:
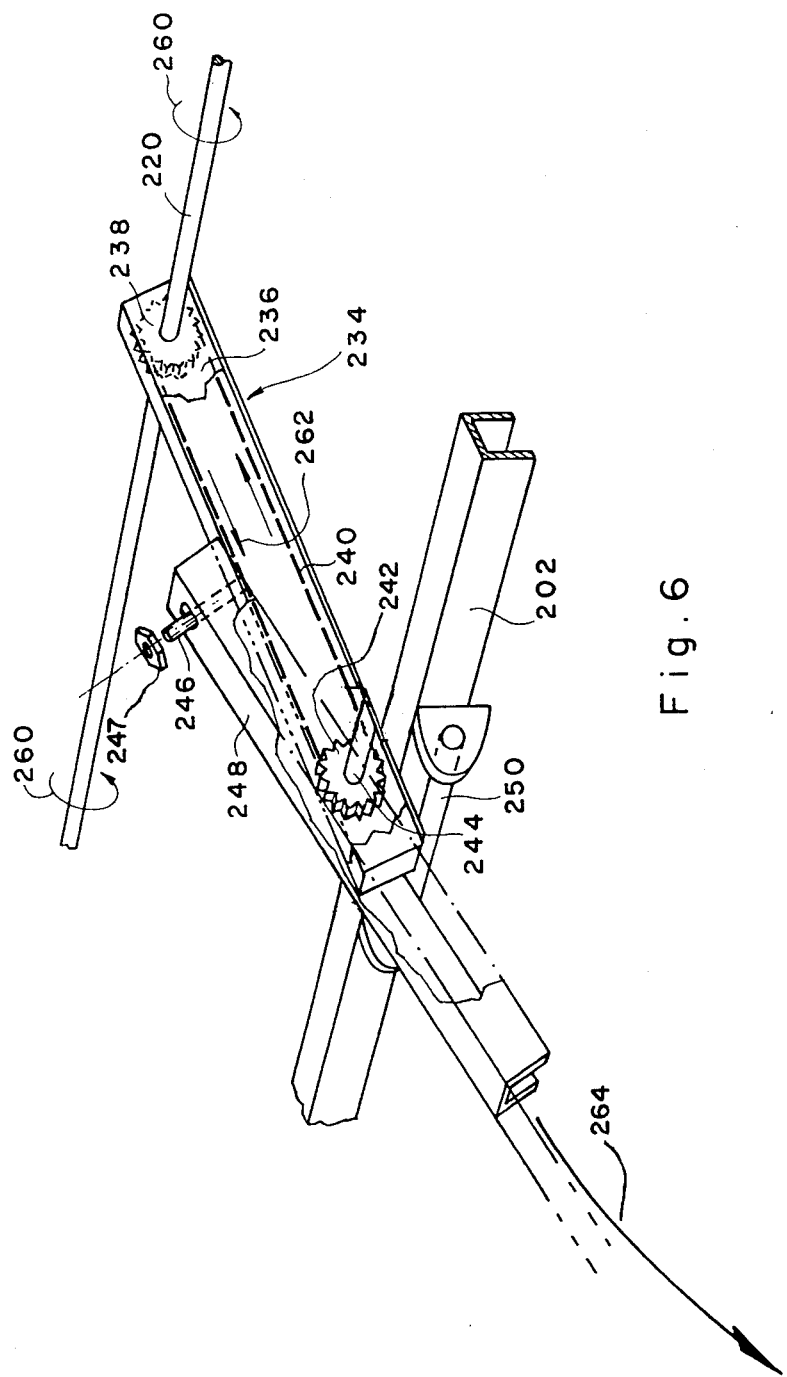
FIG. 6 is a pictorial illustration of a portion of the apparatus of FIG. 5.

From a consideration of FIGS. 5 and 6 it may be appreciated that the rotation of axle 220 determines both the position of axle 220 on the cam path as well as the amount by which upper shaft 236 is overlapped by lower shaft 248. As axle 220 rotates in a direction indicated by arrows 260, sprocket 238, rotating together therewith, causes chain 240 to revolve thereabout in a direction indicated by arrow 262. Pin 246 thus moves downward along shaft 236 causing shaft 248 to extend in a direction indicated by arrow 264. The various stages of positioning of the upper and lower shafts will be described hereinafter with reference to FIGS. 8A-C.

There is attached onto one of elongate members 202, a pair of rollers 250 and 252 which engage upper shaft 236 when axle 220 lies along the short leg of the L-shaped cam path.

Figure 7:
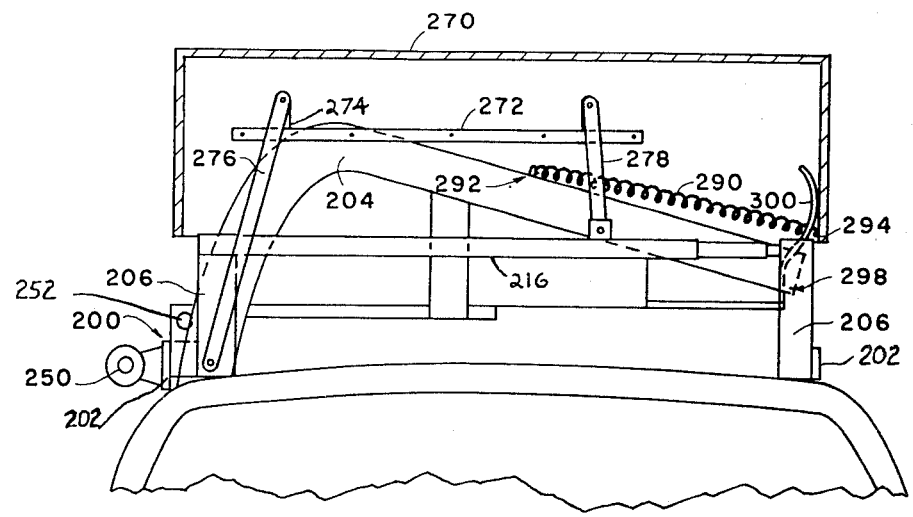
FIG. 7 is a sectional side view illustration of the apparatus of FIG. 5.

As can be seen in FIG. 7, a cover member 270, typically formed of moulded fiberglass is hinge mounted onto support frame 200. A hinge mounting member 272 is fixed to the inside surface of each side of the cover member, and includes upstanding portions 274. Pivotably mounted at the uppermost parts of upstanding portions 274 are pairs of forward and rear pivoting elements 276 and 278. Elements 276 are longer than elements 278. Elements 276 are pivotably mounted onto the forward ends of posts 206 while elements 278 are pivotably mounted onto transverse braces 216.

Figure 8A:
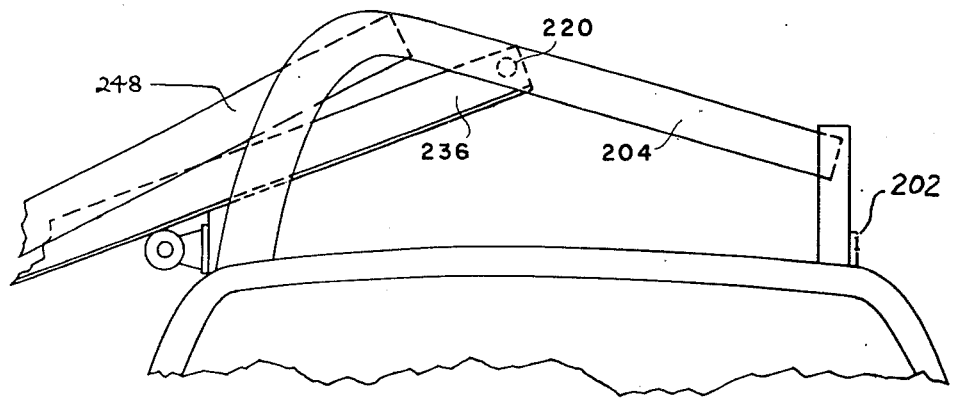
FIGS. 8A, 8B and 8C illustrate various positions assumed by the apparatus of FIG. 5 during raising or lowering thereof.
Figure 8B:
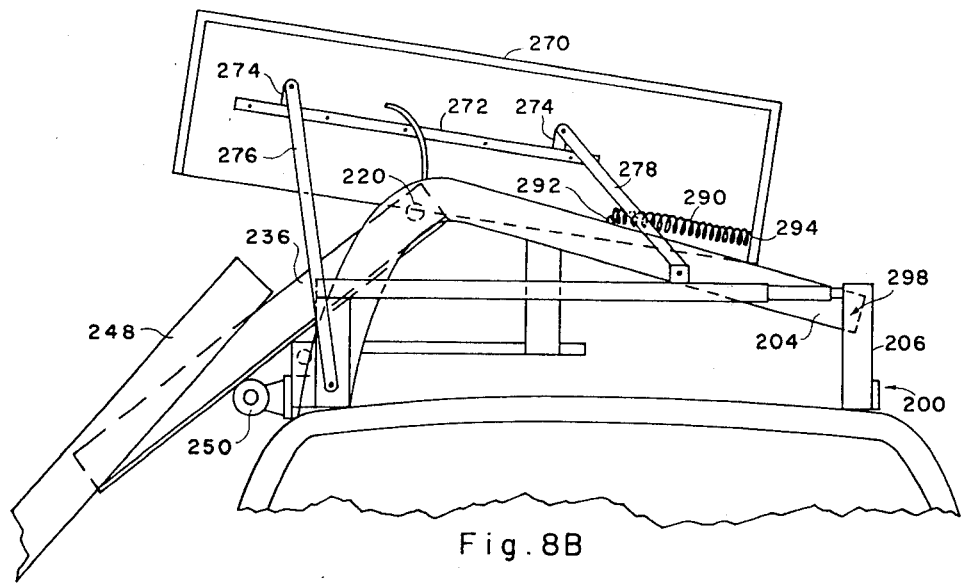

From a comparison of FIGS. 5, 7 and 8B it can be seen that when cover member 270 is in a generally level lowered orientation, element 276 is in a slanted orientation and when cover member 270 is in a slanted raised orientation, element 276 is in an upright orientation.

A tension spring 290 is extended between a location 292 on cam member 204 and a location 294 at the rear of the cover member on each side of the cover member, serving to urge the cover member into a slanted raised position illustrated in FIGS. 5 and 8B. The cover member will assume this position except when axle 220 and frame 230 are located adjacent the extreme end of the long leg of the cam members, indicated by arrow 298, in FIG. 5. When the frame is in this position a pair of projections 300, fixed with respect to frame 230, force the cover member backwards against the urging of springs 290 and into the level lowered position.

The operation of the apparatus described above will now be briefly described with reference to FIGS. 7 and 8A-8C. It is to be noted that motor 224 shown in FIG. 5 provides the power for all of the operations of the apparatus. Motor 224 is powered by a motor vehicle battery and is governed by conventional control apparatus (not shown) for determining the incidence and direction of operation. In contrast to alternative embodiments of the invention wherein microswitches are employed for terminating operation of the invention, here the motor is equipped with a conventional automatic shut-off which terminates its operation in the presence of a load which exceeds a predetermined limit. Thus when lower shaft 248 reaches the ground surface and can extend no more, the suddenly increased load on axle 220 causes termination of motor action. Similarly, when axle 220 reaches the end of the cam path indicated by arrow 298 and can travel no more, the resulting load on the axle causes termination of motor operation.

FIG. 7 shows the apparatus in a storage orientation such that the extendible shaft assembly 234 is entirely covered by cover member 270 and axle 220 is adjacent location 298. Once the motor is activated to lower a wheelchair (not shown) mounted on the apparatus, the resulting rotation of axle 220 causes the axle as well as frame 230 mounted thereon to move forward along the cam path. As frame 230 and projections 300 mounted thereon move away from location 298, the action of springs 290 causes cover member 270 to attain a slanted raised orientation as seen in FIGS. 5 and 8B.

Figure 8C:
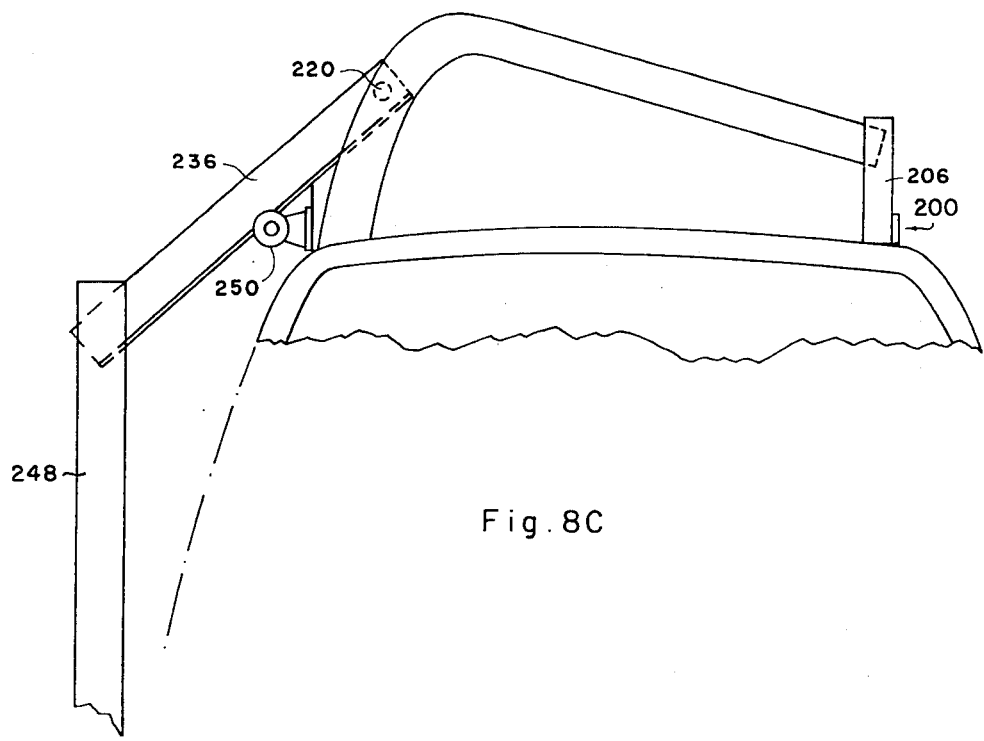

FIG. 8A illustrates the upper and lower shafts 236 and 248 at an intermediate point along the cam path, and FIG. 8B shows a further intermediate point with lower shaft 248 partially extended. FIG. 8C illustrates a final point with lower shaft 248 fully extended and vertically disposed and angled with respect to upper shaft 236. It is a particular feature of the coupling incorporating pin 246, shown in FIG. 6, mounted onto chain 240 that sufficient flexibility is provided to permit the upper and lower shafts to lie at angles to each other as illustrated. By adjusting the position of nut 247 on pin 246 the angular disposition of the upper and lower shafts may be governed to accomodate different cars and the needs of the individual user.

Raising of the apparatus is achieved similarly to lowering by motor rotation in an opposite direction.

Figure 9A:
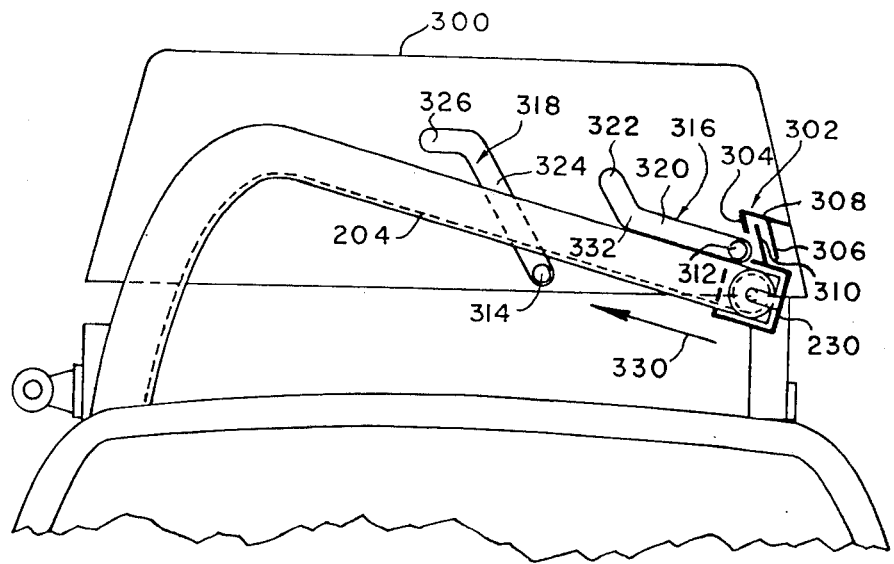
FIGS. 9A and 9B illustrate an alternative type of cover coupling.
Figure 9B:
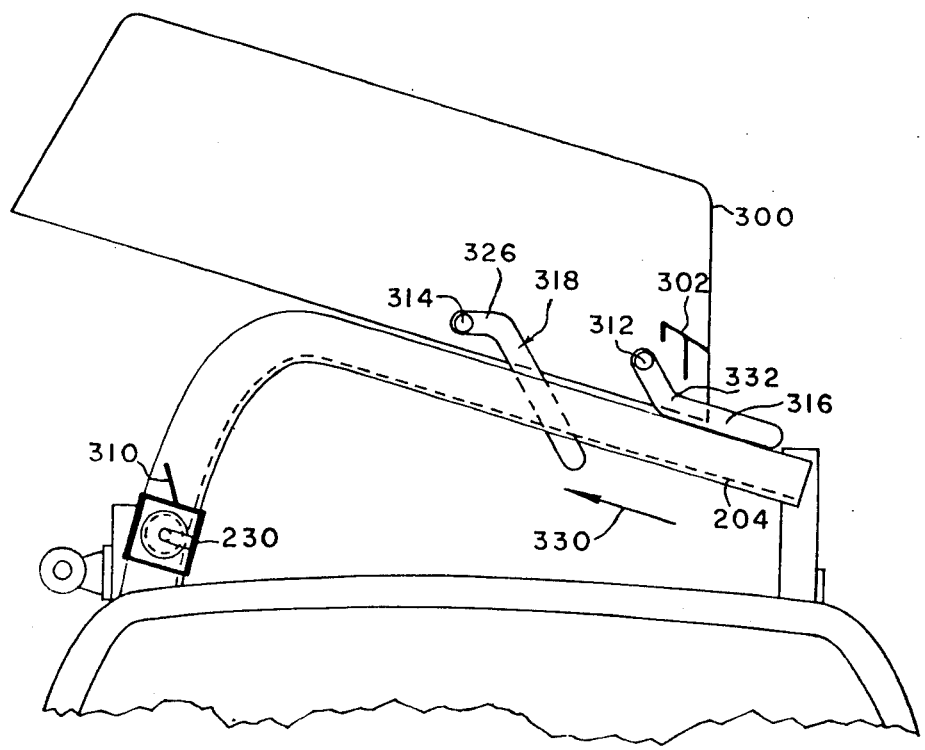

Reference is now made to FIGS. 9A and 9B which illustrate an alternative type of coupling for the cover member which does not involve the use of springs. A cover member 300 is illustrated having mounted therein a catch member 302 formed in the shape of a 7 defining first and second upstanding portions 304 and 306 joined by a top member 308. A pin element 310, fixedly attached to frame member 230 (FIG. 5) is insertable into engagement with the catch member 302 when the cover member is in a fully closed orientation, and during a portion of its movement.

Attached to the interior of each of the side walls of the cover member 300 are a pair of pins 312 and 314, only one member of each pair being seen in the drawings. Pins 312 and 314 engage respective cam members 316 and 318 which are fixedly attached onto each of cam members 204. Cam members 316 include a straight portion 320 extending along the cam path defined by cam members 204 and an upwardly curved portion 322. Cam members 318 define a generally straight upwardly inclined portion 324 and a generally horizontal portion 326.

The engagement of pins 312 and 314 with respective cams 316 and 318 fully defines the orientation of the cover member during movement of the moving frame member 230 along the cam path defined by cam members 204 during raising and lowering of the invalid aid appliance.

When the apparatus is engaged in lowering the mobility aid appliance from a storage orientation, the apparatus is initially oriented as seen in FIG. 9A and the frame member moves in a direction indicated by an arrow 330. The engagement of pin element 310 in catch member 302 causes the cover member 300 to also move initially in direction 330. The motion of the cover member is governed by the engagement of cams 316 and 318 and respective pins 312 and 314. The cover member continues to move in direction 330 until pin 312 reaches a location 332 on cam 316.

As pin 312 begins to rise in accordance with the curvature of cam 316 beyond location 332, the cover member is raised and thus pin element 310 becomes disengaged from catch member 302, thus decoupling the cover member from the moving frame member 230 and terminating the motion of the cover member.

Due to the fact that pin 314 is found to the right of the center of mass of the cover member, pin 312 tends to remain in the raised orientation and does not tend to slide downwardly along cam 316. Cam 318 is angled such that the movement of the cover member in direction 330 causes the cover member to be tilted upwards as seen in FIG. 9B, to enable ready removal of the mobility air appliance and associated transfer apparatus from under the cover member.

Portion 326 of cam 318 is horizontal or slightly slanted downwardly such that pin 314 which reaches portion 326 at the end of its travel, tends to stay on portion 326 and does not tend to slide backwards along cam 318. Thus the cover member tends to remain in the raised, tilted open orientation illustrated in FIG. 9B.

When the apparatus operates to raise a mobility aid appliance, the appliance is inserted under the cover member when in the open orientation of FIG. 9B. Continued movement of the frame member 230 in a direction opposite to that indicated by arrow 330 results in engagement of pin element 310 with catch member 302. Continued movement of frame member 302 in a direction opposite to that of arrow 330 causes the cover member to move in accordance with the cam path defined by pins 312 and 314 and cams 316 and 318 and return to its storage position illustrated in FIG. 9A.

Figure 10A:
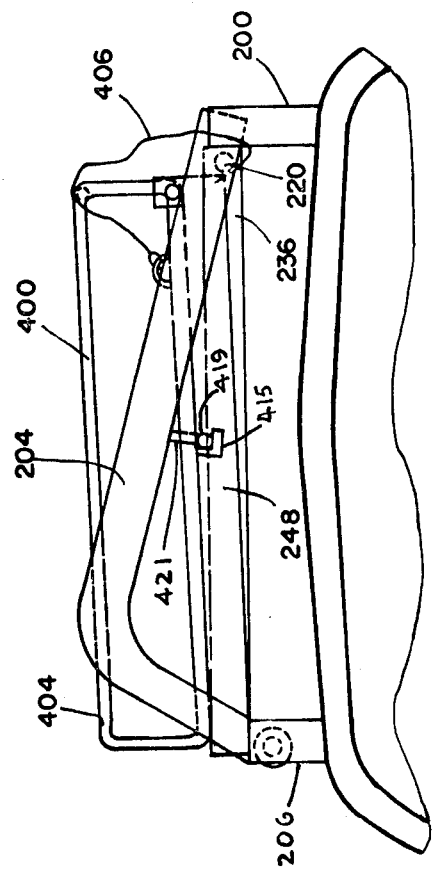
Figure 10B:
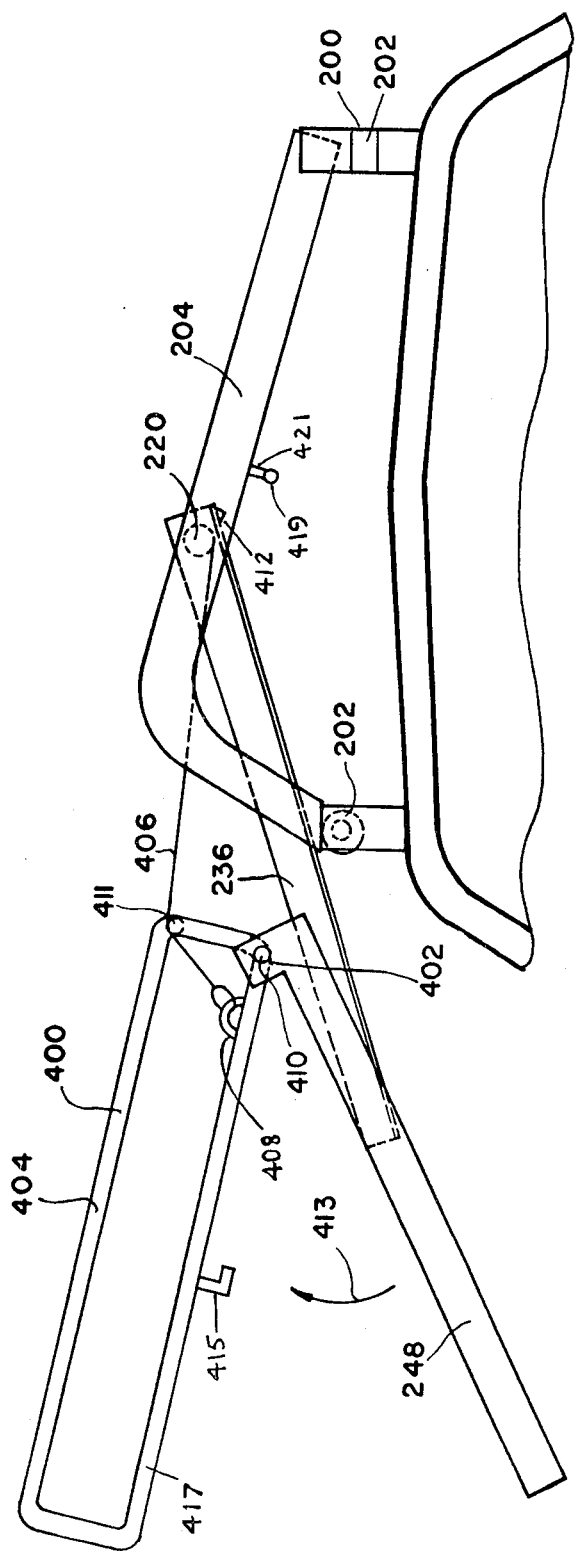

Reference is now made to FIGS. 10A-C which illustrate a device for selectably positioning an invalid's mobility aid appliance in accordance with an alternative preferred embodiment of the invention.

As seen hereinabove, there is provided a fixed support frame 200 comprising a pair of elongate members 202 joined by a pair of transversely disposed generally L-Shaped cam members 204 which are mounted on upstanding posts 206, fixedly attached to members 202. Cam members 204 are formed with an interior chain-like surface 214 suitable for permitting a toothed member to be driven in a non-slipping fashion therealong.

A drive axle 220, formed with sprockets 222 at the extreme ends thereof is disposed transversely between cam members 204 and such that sprockets 222 engage the chain-like surface 214 of the respective cam members. This engagement permits rotational motion imparted to axle 220 to cause motion of axle 220 along the path defined by cam members 204. Rotational motion is imparted to drive axle 220 by a motor (not shown) which may be similar to its mounting to motor 224 mentioned hereinabove.

Rotatably mounted onto axle 220 is an extendible shaft assembly 234. As seen with particularity in FIGS. 5 and 6 hereinabove, the extendible shaft assembly comprises an upper shaft 236 of generally U-shaped cross-section. Shaft 236 is apertured at its upper end to permit axle 220 to extend therethrough. Located intermediate the upstanding portions of the U-shaped upper shaft is a sprocket 238 which is fixed to axle 220 for rotation together therewith. An endless chain 240 engages sprocket 238 and similarly engages a second sprocket 242 which rotates about an axle 244 fixed with respect to shaft 236 and located at an end thereof opposite from sprocket 238.

Chain 240 lies exposed from above. Fixedly attached to a link of chain 240 is an upstanding threaded pin 246. Pin 246 engages the upper end of a lower shaft 248, and is attached thereto as by a nut 247. Lower shaft 248 is an elongate member of generally U-shaped cross section and is oriented oppositely to upper shaft 236, and has wheelchair support apparatus attached thereto.

It may be appreciated that the rotation of axle 220 determines both the position of axle 220 on the cam path as well as the amount by which upper shaft 236 is overlapped by lower shaft 248. As axle 220 rotates in a direction indicated by arrows 260, shown in FIG. 6, sprocket 238, rotating together therewith, causes chain 240 to revolve thereabout in a direction indicated by arrows 262. The various stages of positioning of the upper and lower shafts will be described in FIGS. 10A-C herein. There is attached onto one of elongate members 202 a roller 252 which engages upper shaft 236 when axle 220 lies along the short leg of the L-shaped cam path.

Figure 11:
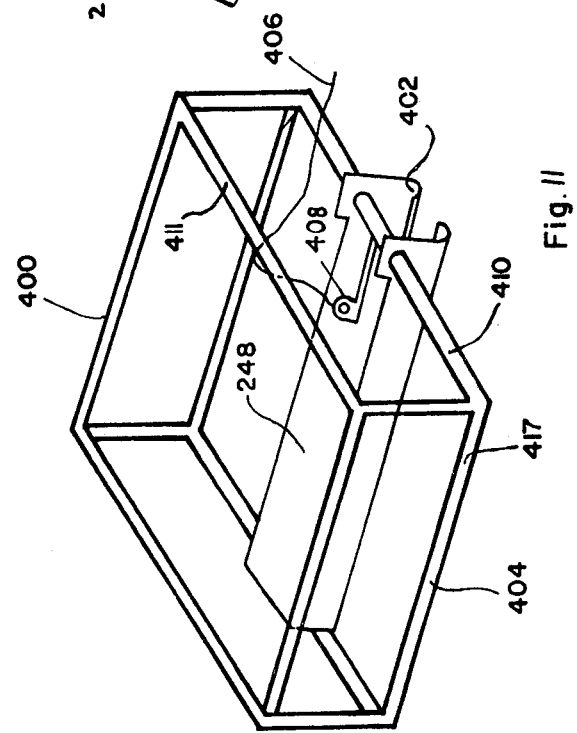
FIG. 11 is a schematic pictorial illustration of a cover mounted in accordance with an embodiment of the invention.

Referring now additionally to FIG. 11, it is seen that a traveling cover member 400 is pivotably mounted onto lower shaft 248 at a mounting protrusion 402 located at the top outer facing portion of the lower shaft member. Traveling cover member 400 is typically formed of a tubular frame 404 covered with a relatively light weight material such as canvas or plastic sheeting. The tubular frame may also be made of a light weight material, such as aluminum. The light-weight covering material is not shown in the drawing, in order to enable details of the apparatus lying thereunder to be seen.

Selective tilting of the cover member 400 relative to lower shaft 248 is provided by a cable 406 which is attached at one end to a mounting member 408 which extends forwardly of a strut 410 by which the frame is mounted onto protrusion 402 of the lower shaft member. Cable 406 is attached at a second end onto a protrusion 412 located at the top underside portion of upper shaft 236.

In order to secure the cover member 400 onto cam member 204 there is provided a generally L shaped catch member 415 extending downwardly from a longitudinal tubular member 417 forming part of cover member 404. When the cover member is in a storage position as illustrated in FIG. 10A, the catch member engages a transverse bar 419 which is disposed below cam member 204 by a mounting element 421. It is appreciated that once the cover member begins to be lowered, the catch member disengages from the bar 419.

Cover member 400 is operative for covering only the wheelchair (not shown) carried by the lifting apparatus and is thus smaller and lighter than cover member 270 described hereinabove. The changing orientations of the cover member along its travel path will now be described with reference to FIGS. 10A-10C.

FIG. 10A shows the apparatus in a storage orientation on the roof of an automobile. The upper and lower shaft members 236 and 248 are nearly overlapping since axle 220 is at its extreme upward position along the cam path defined by cam members 204. Cable 406 is loose since the mounting locations of its two ends lie adjacent each other and the cover member 400 lies generally parallel to lower shaft member 248.

FIG. 10B shows an intermediate stage in lowering of the wheelchair which is supported on lower shaft member 248. Here as axle 220 approaches the short arm of the cam path, the lower shaft member 248 moves forwardly relative to the upper shaft member 236. This relative movement causes the cable 406, which is looped over strut 411 which lies parallel to and above strut 410, to become taut and to pivot the cover member about strut 410 away from lower shaft member 248 in a direction indicated generally by an arrow 413.

FIG. 10C shows a fully lowered orientation where axle 220 lies along the short arm of the cam path, and the lower shaft member 248 is fully extended from upper shaft member 236 and angled with respect thereto. The increased distance between the upper portions of the upper and lower shaft members causes cable 406 to cause even further pivoting of the cover member in a direction 413 away from the lower shaft member, thereby providing unimpeded access to the wheelchair.

It is to be appreciated that loading of the wheelchair onto the roof of an automobile comprises the steps illustrated above in the opposite order.

The securing of a wheelchair to the selectable positioning apparatus described hereinabove will now be described with particular reference to FIGS. 12 and 13.

Figure 12:
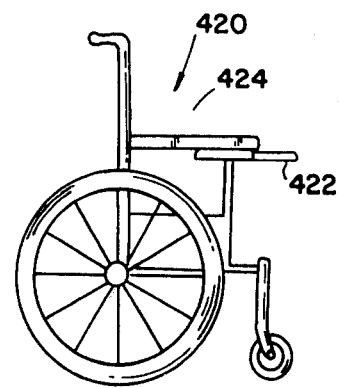
FIG. 12 is an illustration of a wheelchair fitted with an extensible mounting rod.

FIG. 12 illustrates a folding wheelchair 420 of conventional construction which is fitted with an extensible securing rod 422 which is preferably mounted onto an armrest support member 424 of the wheelchair and retractable into a recess formed therein.

Figure 13:
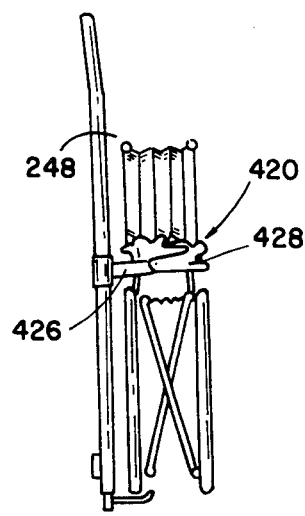
FIG. 13 is an illustration of the wheelchair of FIG. 12 secured in engagement with the securing apparatus of the present invention.

FIG. 13 illustrates the wheelchair of FIG. 13 in a folded orientation secured to element 248 of the selectable positioning apparatus described hereinabove, by securing apparatus comprising a bar member 426 attached to element 248 and a holder element 428.

It will be appreciated by persons skilled in the art that the invention is not limited to what has been particularly shown and described hereinabove. Rather the scope of the present invention is defined only by the claims which follow.

We claim:

1. A device for selectively positioning a mobility aid appliance for an invalid onto an automobile comprising:
   (a) a fixed support apparatus mountable onto the roof of an automobile, and defining a fixed track;
   (b) an axle arranged for rotational rolling engagement with said track and movement therealong;
   (c) a mobility aid appliance support shaft means, said shaft means comprising first and second shaft elements which are extensible with respect to each other, said shaft means further defining first and second ends, said first end being rotatably mounted onto said axle, and said second end being associated with a mobility aid appliance for support thereof, said second shaft element defining said second end; and
   (d) a cover rotatably mouned onto said second shaft element.

2. A device for selectively positioning a mobility aid appliance for an invalid onto an automobile comprising:
   (a) a fixed support apparatus mountable onto the roof of an automobile and defining a fixed track;
   (b) an axle arranged for rotational rolling engagement with said track and movement therealong;
   (c) a mobility aid appliance support shaft means defining first and second ends, said first end being rotatably mounted onto said axle, and said second end being associated with a mobility aid appliance for support thereof;
   (d) a cover rotatably mounted onto said shaft means; and
   (e) a means for governing the angular orientation of said cover as a function of the position of said axle along said fixed track, said means comprising a cable connected between said cover and said first shaft member and said cable being looped over part of said cover.

* * * * *